United States Patent [19]
Horne

[11] 3,892,588
[45] July 1, 1975

[54] METHOD OF KILLING ROOTS AND ORGANIC GROWTHS IN SEWER PIPES

[75] Inventor: Frederick F. Horne, Carmel Valley, Calif.

[73] Assignee: Airrigation Engineering Company, Inc., Carmel Valley, Calif.

[22] Filed: Apr. 30, 1973

[21] Appl. No.: 355,761

Related U.S. Application Data

[60] Division of Ser. No. 122,738, March 10, 1971, Pat. No. 3,741,807, which is a continuation-in-part of Ser. No. 850,321, Aug. 6, 1969, abandoned, which is a continuation-in-part of Ser. No. 760,822, Sept. 19, 1968, abandoned.

[52] U.S. Cl. ............... 134/24; 134/22 R; 134/22 C
[51] Int. Cl. .................................................. B08b 9/02
[58] Field of Search ............... 71/101; 424/286; 260/513.5; 134/22 R, 22 C, 24, 10, 166 C, 167 C, 168 C, 169 C; 138/93; 252/DIG. 1; 137/15

[56] References Cited
UNITED STATES PATENTS

| 2,927,609 | 3/1960 | Vander Lans | 138/93 |
| 2,976,191 | 3/1961 | Weston | 134/24 |
| 3,085,043 | 4/1963 | Beaver et al. | 260/513.5 |
| 3,272,650 | 9/1966 | Macvittie | 134/22 R X |

OTHER PUBLICATIONS

Sveshnikova, "Carbathione as Complex Soil Fumigant," (1965); CA, Vol. 64, p. 16557, (1966).
McCutcheon, Detergents and Emulsifiers, (1966), p. 209 [TP 990 D4].
Neely et al., "Effects of SMDC on Elm Roots," (1966), CA, Vol. 65, (1966), p. 11266.
Leonard et al., "Chem. Eradication of Unwanted Grape Roots," (1960), CA, Vol. 54, (1960), p. 17775.

*Primary Examiner*—S. Leon Bashore
*Assistant Examiner*—Marc L. Caroff
*Attorney, Agent, or Firm*—Owen, Wickersham & Erickson

[57] ABSTRACT

Sewer pipes are cleaned of roots and other organic growths by temporarily plugging the pipe, filling the pipe upstream of the plug with an aqueous solution of a phytocidal fumigant and a nonionic surfactant, and unplugging the pipe after allowing sufficient time for the roots and growths to be killed by the solution.

5 Claims, 9 Drawing Figures

PATENTED JUL 1 1975  3,892,588

METHOD OF KILLING ROOTS AND ORGANIC GROWTHS IN SEWER PIPES

This is a division of application Ser. No. 122,738 filed Mar. 10, 1971, now U.S. Pat. No. 3,741,807, issued June 26, 1973, which was a continuation-in-part of application Ser. No. 850,321 filed Aug. 6, 1969, now abandoned, which was a continuation-in-part of application Ser. No. 760,822 filed Sept. 19, 1968, now abandoned.

This invention relates to the treatment of sewers and other conduits to control plant growth therein. It relates to novel compositions for use in the sewers to kill root growth therein; to novel effective methods for application of this composition; and to apparatus by which the composition may be applied.

Many materials for controlling plant root growth in sewers and other drainage conduits have been tried, such as copper sulfate, which has been the most widely used chemical for this purpose over many years, but none of them has proven satisfactory in the long run. One of the main problems has been the fact that most tree roots come down from above, and such roots have not been affected by the treatments tried. The reasons for this ineffectiveness have been twofold: (1) the chemicals have been contained in and confined to the sewer water in the lower part of the pipe and therefore do not even touch the roots that lie above the sewer water; (2) such chemicals require a relatively long exposure to the roots to be effective, so that the only roots killed are those which remain for a long enough period in contact with the water containing such chemical agents. To explain further, sanitary sewers are designed to transport waste water at much less than the capacity of their conduits; hence, the waste water is normally in only the lower part of the pipe; thus, the copper sulfate and other herbicides and fungicides carried in the waste water under normal flow could be effective only in that lower part of the pipe where the roots may be in contact with the sewer pipe water, and not elsewhere. However roots entering from above tend to die anyway when they reach the normal water flow line, due to the lack of oxygen in the sewage; these dead roots have practically no absorptive ability, but roots continue to grow above the flow line and to occupy and fill the major area of the pipe, eventually resulting in plugging. The prior art treatment materials may be potentially effective on any tree root which enters the sewer from below, but lack of oxygen generally prevents this from happening; so this limited effectiveness has been insufficient to prevent tree roots from plugging sewers. No composition carried by the sewer waste water has been able to keep the entire pipe free from roots, nor to rid the pipe from all roots. Moreover, no sufficiently effective method of sewer pipe treatment for this purpose has heretofore been found.

An excellent material for killing tree roots is sodium methyldithiocarbamate, a chemical heretofore used successfully as a soil fumigant and for some other things, but it did not prove to be as effective in sewers as one might expect; the vapors alone proved to be rather ineffectual. It was proposed that a chemical fire-extinguisher foam be used as an extender or carrier, and such chemical foam with the liquid fumigant entrained was injected into sewers; by the expansion pressure exerted, the fire-extinguisher foam was forced along the conduit and as the foam disintegrated, active gaseous fumigant was released. Improvement was, indeed, obtained by this expedient, but unfortunately this method required the conduit to be completely filled under expansive foam pressure in order to distribute the active fumigant to the surfaces to be treated, and this required extremely large volumes of both the chemical fire-extinguisher foam and the active agent, as well as pressure to push the foam through the pipe. Thus, that process was too expensive for general use. Moreover, the chemical fire-extinguisher foam itself tended to block the sewage flow, so that the sewer had to be taken out of service for extended periods during this treatment. Further, the charging into the pipes of the fire-extinguisher foam with the entrained active agent was a time-consuming operation, and the labor cost was not economically practical for large diameter or long conduits, especially when that cost was added to the materials cost of the large volume of chemical foam extender needed. Event then, many roots were not killed and remained.

Other investigations showed that, when sodium methyldithiocarbamate was introduced by spraying the pipe interior with a simple water solution, it tended to decompose too quickly from the water present to be fully effective. Also, the water solution of the active chemical readily ran down the pipe walls and quickly became part of the sewage flow, bypassing the roots above it. These investigations led me to believe that organic slime and other soils and greases were tending to protect many tree roots from surface absorption and treatment, so that they were not significantly damaged by what otherwise might be considered intensive treatment. Furthermore, the roots appeared to be protected in many instances by outer cell walls rich in cutin and suberin, which did not significantly imbibe either water or the fumigant solution in water. A closed television circuit which was lowered into sewers enabled the taking of pictures from outside the pipe as well as displaying an image of what was inside the sewer, and these pictures showed that many such roots were not killed even after very intensive treatment by water solutions containing sodium methyldithiocarbamate.

The present invention provides a solution to the problem. All roots within the sewer are killed, no matter from what direction they come and no matter at what level the waste water flows. Moreover, a new and economical use of the composition of this invention, makes it possible to kill these roots without killing or even damaging the same or other roots outside the sewer and without damaging the plants from which the roots come. However, to give longer protection, it is also possible, in instances where the joints of the pipe are damaged or leak to extend the killing action somewhat beyond the pipe interior, thereby delaying the regrowth considerably, still without substantially damaging the plants, because the material used herein is not a systemic plant poison.

Even more important, my new composition penetrates the cutin and suberin of the root walls, which are impermeable to untreated water, and carries the active material inside the root cells, so that the toxic effect is greatly enhanced. When used as a spray, my invention provides a novel small-bubble foam, which adheres to the roots. When used in a soak, more dilute solutions are quite effective. My new composition acts even on roots and other growths which are covered with slimes and greases, and it also cleans the roots and the pipe while killing these biological growths and the roots.

The chemical composition of this invention is a combination of standard alkali metal alkyl dithiocarbamade in its usual inert ingredients (e.g., water), with a biodegradable nonionic surfactant. This combination accomplishes what neither ingredient can do alone: neither the surfactant nor the dithiocarbamate, when used alone, kills a significant amount of sewer roots. However, the combination kills all or substantially all the sewer roots, when properly applied. Typical alkali metal alkyl dithiocarbamates usable in this invention and their formulas are:

sodium N-methyl dithiocarbamate

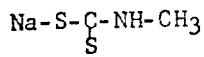

sodium N-ethyl dithiocarbamate

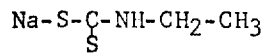

sodium N-isopropyl dithiocarbamate

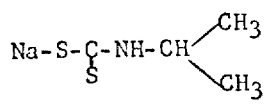

sodium N-propyl dithiocarbamate

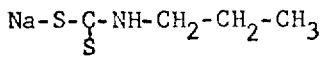

sodium N-allyl dithiocarbamate

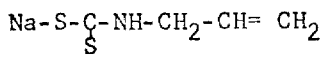

In each of the above, potassium may be substituted for sodium. So may other alkali metals, but the sodium and potassium compounds are the cheapest, the most soluble, and probably the best. The first compound named above, also called simply sodium methyl dithiocarbamate is the most volatile and is usually preferred.

A preferable class of surfactants usable in this invention is the alkyl aryl polyether alcohols and the ethers thereof. For example, the octylphenoxyethanol, such as a watersoluble iso-octyl phenoxy ethanol containing 10 moles of ethylene oxide (Triton X-100) has been proved very effective. Another alkylaryl polyether alcohol is Retzanol NP100, of Retzloff Chemical Co, a nonyl phenoxy polyoxyethylene ethanol, a clear liquid with a pour point below 0°C, a specific gravity of 1.06 at 25°C, soluble in water. Another is Tergitol NPX (Union Carbide) a nonyl phenyl polyethylene glycol ether.

By adding the surfactant in amounts of 12½% (one eighth) of the volume of the regular fumigant mixture (a water solution having an active ingredient rating of about 36%, meaning a 36% aqueous solution of for example, sodium methyldithiocarbamate), a preferred concentrate formulation is obtained wherein the active ingredient, the sodium methyldithiocarbamate, is about 28 to 30% of the whole. In other words, my new composition may be distributed to buyers as a concentrate consisting of a water-soluble foam-type surface-active formulation, having about 30% of alkali methyldithiocarbamate, about 12% of the surfactant, and about 58% water. In more approximate figures, this concentrate is an aqueous solution of about three-tenths fumigant and one-eighth surfactant. There is about twice or thrice as much of the methyldithiocarbamate as of the surfactant, water making up the remainder. Other alkali metal alkyl dithiocarbamates are used in the same amounts.

Use may be by soaking, and for actual use, more water is added to the concentrate. For soaking, the fumigant-surfactant concentrate is further diluted, down to about one or two percent fumigant concentration, and then a length of the sewer pipe is filled and soaked. Here, again, the effectiveness is quite different from filling a sewer pipe with a water dilution of the fumigant alone at the same fumigant concentration. The surfactant acts to clean and expose the roots while the fumigant simultaneously attacks them. Penetration is assured by having both the surfactant and fumigant simultaneously present. The biological slimes, fatty acid soaps and greases, etc., are effectively emulsified and dispersed into the waste water flow, and the root cells are destroyed, causing the roots to decompose and slough off. By employing a pair of plugs and working with gravity from an upper level down, the same solution can be used in several successive soaking operations, thereby economizing in material, and for this purpose novel plugging apparatus and systems have been developed.

Especially in the soak-treatment, growth inhibitors may be incorporated to cause greater root die-back and to prolong the time during which no re-treatment is required. For this purpose, the only limitations on the use of any particular growth inhibitor (growth inhibitors being a wellknown group of herbicides) are that it not be systemic, so as to poison the entire plant and kill it (though they may even be systemic to a degree, i.e., to kill roots back a few inches or so) and that there be no chemical reaction between the growth inhibitor and the fumigant or surfactant so as to nillify any of the ingredients. For example, 4-(methylsulphonyl)-2,6-dinitro-NN-dipropylaniline, trifluralin (an improved common name for 2,6-dinitro-NN-dipropyl-4-trifluoromethylaniline), dichlobenil (an approved common name for 2,6 dichlorobenzonitrile), and S-(O,O-diisopropyl phosphorodithioate) of N — (2 mercaptomethyl) benzenesulfonamide) have all been tried and have been found to give very satisfactory results, with root killbacks a few inches beyond the pipe walls. Also, where a pipe has breaks or its joints are broken or leak, the soak treatment sets up hydraulic pressure and, in conjunction with the growth inhibitor, extends the treatment beyond the interior of the pipe and considerably inhibits or delays regrowth, yet without significant damage to the plants themselves.

In some instances, it may be desirable to add a further treatment simultaneously to rid the sewer of insects, such as spiders, roaches, and sewer flies. Some of them may be killed by the fumigant, but other chemicals may be added to the solution to obtain a residual control, so long as they do not react with the other ingredients in a way that diminishes the activity and efficiency of any of the treating materials. Chlordane, DDT, diazinone, roach wettable powders and so on, may be added in effective amounts, as may some specific fungicides, if desired, so long as the added chemicals do not detrimentally react with the fumigant or surfactant (a growth inhibitor, if present) in the original solution.

My new composition is nonsystemic, so that it does not harm the plants themselves, but it does control all the roots which are in sewer mains or other conduits so treated, and it also helps to control any fungi, or bacteria such as produce slimes, and fatty acids. In this way, the generation of hydrogen sulfide in the sewers is reduced, and the roots and organic deposits are handled so effectively by my new composition that substantially no harmful residue remains. The gaseous fumigant itself is dissipated within a few hours, and the composition as a whole is readily biodegradable. Moreover, the biological slimes, fatty acids, etc., are effectively emulsified and dispersed into the waste water flow, and the root cells that are destroyed result in the decomposition and sloughing off of the roots, which are thus carried down the sewer.

To illustrate the biological effectiveness of the invention, a sample of the solution, diluted to (20.4% active sodium methyldithiocarbamate) was bioassayed in comparison to the standard solution (32.7% active material). The procedure followed was to dilute each solution with three parts water and then place 0.1 ml of the diluted solution into vials containing 9.9 ml of sterile Difco bacto-malt broth or bacto-nutrient broth. The broth was then inoculated with spore suspensions of *Aspergillus niger*, *Penicillium italicum*, *Escherichia coli*, and *Staphylococcus aureus*. The vials were sealed and, after 1 week, observations were made on the growth of the organisms in the vial. All vials inoculated with both formulations remained clear and no growth of the organisms occurred. The growth of the fungi and bacteria in untreated vials was heavy.

Other objects and advantages of the invention will appear from the following description of a preferred form thereof.

In using the soaking process, the outside apparatus can be very simple. A container and a hose, source of air pressure (even a hand pump, or a motor compressor) are about all that is needed. For the apparatus of FIGS. 8 and 9, a pump is required. The concentrate is diluted to a fumigant concentration of less than 5%, preferably 1% or 2%. Either 1% or 2% is effective, but 2% is quicker and saves time.

After determining which of the collection lines have known root problems, the operator should start with the first manhole section in the upstream end of the line, preferably where there are four or five sections downstream on the same sewer collection line which can be soaked progressively with the same solution by passing the solution downstream. This is for economy reasons. Unless several sections can be soaked successively with the same solution, the soaking method will be less economical.

Figure 2:
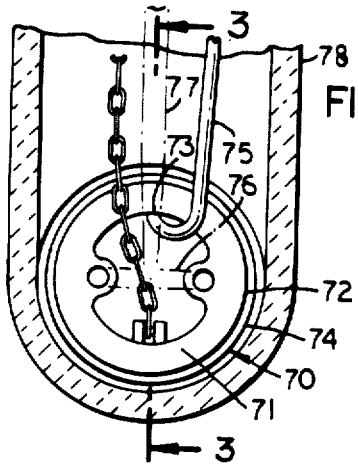
FIG. 2 is a fragmentary view in section of a portion of a sewer and a manhole, with a plug according to the invention in place for practice of the soaking method of the invention, prior to inflation of the plug.
Figure 3:
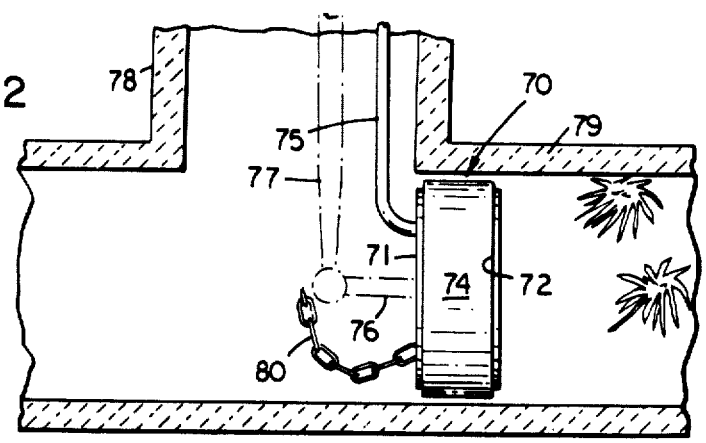
FIG. 3 is a view in section taken along the line 3—3 in FIG. 2.
Figure 4:
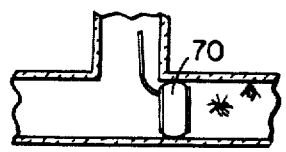
FIG. 4 is a view similar to FIG. 2 with the plug inflated to seal off the pipe.
Figure 5:
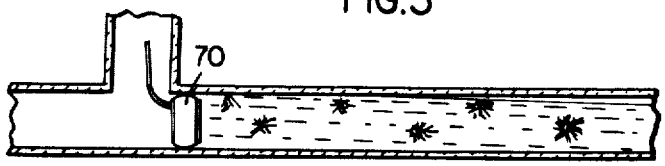
FIG. 5 is a similar view showing the pipe above the plug filled with the soaking solution of this invention.

There are several ways of plugging the sewer. In the system shown in FIGS. 2–5 a plug 70 is used which has a metal body 71 with a rim 72 to which a conduit 73 leads. A rubber diaphragm 74 is either sealed to the rim 72 or is made as a collapsible tube connected to the conduit 73. An air hose 75 is attached to the conduit 73. A bracket 76 enables installation by a pole-like tool 77, so that the plug can be lowered in a manhole 78 to a sewer pipe 73 and located in the end. After use, a chain 80 is used to pull the plug out and enable its recapture. With the plug 70 in place, it is supplied with compressed air through the house 75 and conduit 73 and the diaphragm 74 is inflated, as in FIG. 4 to seal the downstream end of the sewer 79. Going to the manhole next upstream, the dilute 1% or 2% solution is put in through a hose to substantially fill a desired pipe sector. An alternate way of obtaining this result is to add water to the upstream manhole of this section at the rate of approximately 40 gallons a minute and while this water is being added to the manhole, add enough of the concentrate of this invention to assure that the required amount of water to fill the section of the main and the taps will produce the desired 2% solution. For example, assuming that the first section to be soaked is a 6-inch main, 400 feet in length, it will require 1.6 gallons of water per foot, or 640 gallons, to fill the main, and a 2% solution of fumigant will require the addition of 12.8 gallons of the concentrate.

After this solution has been allowed to stand in the line for at least 30 minutes, and preferably for an hour, then the next downstream manhole should have the main plugged by a second plug like the plug 70; then the upstream plug 70 is removed by deflating the diaphragm 74, pulling on the chain 80, and lifting it out by the pole 77. The dilute fumigant solution flows downstream to fill the next section of the line. Again, this re-used batch of solution should remain in the line for thirty minutes to an hour. By following this method of passing the same batch of solution down line for four or five sections of line, it is feasible to use the same batch of solution to treat 1,500 to 2,000 feet of line at a total cost for concentrate of about 5' to 7' per lineal foot.

Figure 6:
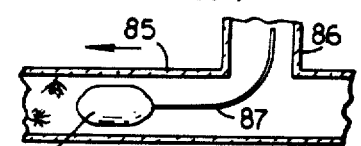
FIG. 6 is a view similar to FIG. 4 showing the insertion in a branch sewer line of an inflatable plug according to the invention, through a house clean-out.
Figure 7:
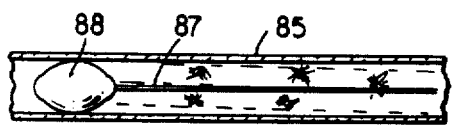
FIG. 7 is a similar view with the plug inserted and inflated and the branch line filled.
Figure 1:
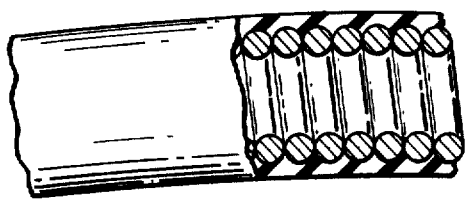
FIG. 1 is a view of a cable-conduit combination.
Figure 1:
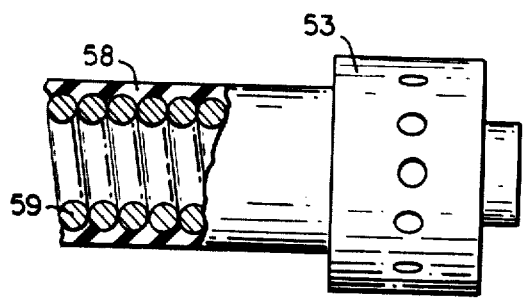

FIGS. 6 and 7 show the soaking system as applied to a branch sewer line 85 as from a house to the main. A clean-out 86 is used in lieu of a manhole, and a cable-conduit 87 like the one in FIG. 1 is used to insert an inflatable plug 88. After the desired length of sewer line 85 has been determined, the cable-conduit 87 and plug 88 are inserted to that length, and then compressed air is sent through the cable-conduit 87 to inflate the plug 88. After treatment, the solution may be released. If desired, before release a plug may be inserted from the manhole at the street. Or, if desired, the used solution may be pumped out from the clean-out 86 through a suitable hose (not shown).

Figure 8:
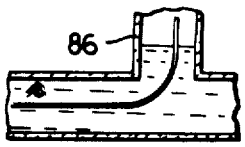
FIG. 8 is a view generally similar to FIG. 2 of a modified form of main-sealing plug with a pumping conduit attached thereto.
Figure 8:
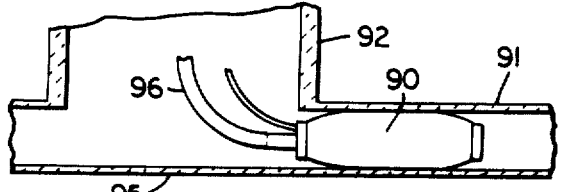
Figure 9:
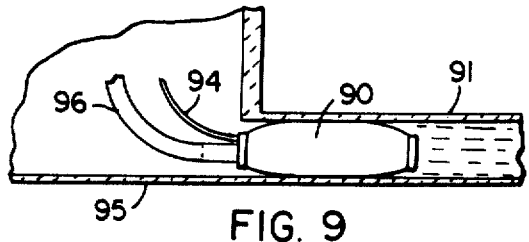
FIG. 9 is a similar view of the plug of FIG. 8 in use.

FIGS. 8 and 9 show how a similar plug 90 can be used in a sewer 91, with insertion through a manhole 92. The plug 90 has a rubber diaphragm 93 that is inflatable through a hose 94. The plug 90 also has a central tube 95 that extends out both ends, and one end is sealed from that side by the affixation of a hose 96. In this instance, the plug 90 is inserted on the downstream end of a desired length of sewer 91, the diaphragm 93 is inflated, and then solution is sent in through the hose 96. After a half-hour or hour, the solution is pumped out by a pump up above the manhole 92. The solution may then be reused at another location by repeating the same procedure.

To those skilled in the art which this invention relates, many changes in construction and widely differing embodiments and applications of this invention will suggest themselves without departing from the spirit and scope of the invention. The disclosures and the description herein are purely illustrative and are not intended to be in any sense limiting.

As pointed out earlier, both the spray method and the soaking method have been given extensive and successful trials in city sewers and have worked. One city that uses a closed-circuit television camera inside the sewers with a screen outside the sewers has been able to see the effectiveness by comparisons of the state of the sewer before application with its state afterwards.

Filling the pipe with the solution of this invention develops a hydrostatic pressure, especially when the sewer pipe is at or above the recommended minimum grade of 4 inches per 100 feet, and this hydrostatic pressure enhances the absorption of the solution by root membranes by overcoming the turgor of the root cells. It has been found that a 1-percent solution of the material held for 15 minutes killed all the roots inside the pipe, and exfiltrated wherever there was a separation or break in the pipe to kill back the roots a few inches, thereby extending the period needed between treatments.

I claim:

1. A method for treating sewer pipes and the like for killing roots and other organic materials therein and keeping the pipes relatively clear and clean, comprising
    temporarily plugging a sewer pipe,
    filling the pipe upstream from the temporary plug with an aqueous solution containing a mixture, in an effective amount sufficient to kill such roots and organic materials, of phytocidal fumigant and nonionic surfactant,
    soaking the pipe and its organic contents with the solution for an effective time interval sufficient to kill such roots and organic materials, and
    unplugging the pipe and letting the solution flow on.

2. A method for treating sewer pipes and the like for killing roots and other organic materials therein and keeping the pipes relatively clear and clean, comprising
    temporarily plugging a sewer pipe,
    filling the pipe upstream from the temporary plug with an aqueous solution containing a mixture, in an effective amount sufficient to kill such roots and organic materials, of phytocidal fumigant and nonionic surfactant,
    soaking the pipe and its roots and organic contents with the solution for an effective time sufficient to kill such roots and organic contents,
    unplugging the pipe and letting the solution flow on,
    temporarily plugging the pipe at a second location downstream from the location where the initial temporary plugging took place, before said unplugging step, so that a second pipe portion is filled with said solution, holding said solution there for an effective time sufficient to kill such roots and organic materials, and then unplugging the pipe at said second location.

3. The method of claim 1 wherein said fumigant is an alkali metal alkyl dithiocarbamate.

4. A method for treating sewer pipes and the like for killing roots and other organic materials therein and keeping the pipes relatively clear and clean, comprising
    temporarily plugging a sewer pipe,
    filling the pipe upstream from the temporary plug with an aqueous solution containing an effective amount of phytocidal fumigant and nonionic surfactant, sufficient to kill such roots and organic materials,
    soaking the pipe and its organic contents with the solution for an effective time interval, sufficient to kill such roots and organic materials, and
    then pumping out the solution.

5. The method of claim 4 wherein said fumigant is an alkali metal alkyl dithiocarbamate.

* * * * *